United States Patent [19]

Moskowitz et al.

[11] Patent Number: 4,956,318
[45] Date of Patent: Sep. 11, 1990

[54] CERAMIC CUTTING TOOL

[75] Inventors: David Moskowitz, Southfield, Mich.; Reuven Porat, Nahariya, Israel

[73] Assignee: Iscar Ceramics, Inc., Livonia, Mich.

[21] Appl. No.: 438,187

[22] Filed: Nov. 20, 1989

[51] Int. Cl.$^5$ ............................................. C04B 35/58
[52] U.S. Cl. ........................................ 501/96; 501/98; 51/309; 82/1.11; 407/119
[58] Field of Search ............... 501/96, 98; 51/309; 408/1 R, 144, 145; 409/131; 82/1.11; 407/118, 119

[56] References Cited

U.S. PATENT DOCUMENTS

| | | | |
|---|---|---|---|
| 3,705,025 | 12/1972 | Daniels | 51/309 |
| 3,989,782 | 11/1976 | Lumby et al. | 264/56 |
| 4,203,733 | 5/1980 | Tanaka et al. | 51/309 |
| 4,241,000 | 12/1980 | McCauley et al. | 264/65 |
| 4,636,374 | 1/1987 | Kurihara et al. | 501/96 |
| 4,670,407 | 6/1987 | Kiehl et al. | 501/98 |
| 4,745,091 | 5/1988 | Landingham | 501/87 |
| 4,761,388 | 8/1988 | Oguri et al. | 501/96 |
| 4,789,277 | 12/1988 | Rhodes et al. | 82/1.11 |
| 4,801,564 | 1/1989 | Baba | 501/92 |
| 4,818,635 | 4/1989 | Ekstrom et al. | 501/92 |

*Primary Examiner*—Mark L. Bell
*Assistant Examiner*—Deborah Jones
*Attorney, Agent, or Firm*—Gifford, Groh, Sprinkle, Patmore and Anderson

[57] ABSTRACT

A ceramic cutting tool is disclosed in which the cutting tool consists essentially of a hot pressed composition of alumina and 6 to 30% by weight of aluminum nitride. This ceramic cutting tool is particularly advantageous for cutting ferrous materials, especially cast iron.

5 Claims, No Drawings

CERAMIC CUTTING TOOL

BACKGROUND OF THE INVENTION

I. Field of the Invention

The present invention relates generally to ceramic cutting tools and, more particularly, to a ceramic cutting tool especially suited for cutting ferrous metals, especially cast iron.

II. Description of the Prior Art

Ceramic cutting tools have been previously used for a number of different machining operations for machining metals. Such machine operations include shaping, milling, planing, turning, drilling and the like. In each instance, however, there is relative movement between the cutting tool and the workpiece in order to perform the machining operation.

In certain applications, ceramic cutting tools enjoy distinctive advantages over other types of cutting tools, such as high speed steel and tungsten carbide tools. In particular, ceramic cutting tools are typically used in high speed cutting applications.

Ceramic materials, most notably alpha alumina ($Al_2O_3$) have been used to produce cutting tools which are capable of operation at higher speeds than the previously known steel and tungsten carbide cutting tools. The tool life of these previously known ceramic cutting tools, however, is often less than the previously known tungsten carbide cutting tools because the ceramic cutting tools are more brittle and less tough than carbides. Furthermore, the impact tolerance of the previously known ceramic cutting tools is relatively low so that such tools are operated at low tool feed rates. Consequently, the actual rate of metal removal is comparable to tungsten carbide tools even though ceramic tools are employed at higher cutting speeds.

There have been a number of different types of compositions used for ceramic cutting tools which are designed to increase the fracture toughness and life of the cutting tool For example, U.S. Pat. No 4,789,277 to Rhodes et al. discloses a cutting tool which is reinforced with silicon carbide whiskers in order to increase fracture toughness. Numerous commercial cutting tools are known which mix titanium carbide to the aluminum oxide in order to enhance the cutting characteristics of the cutting tool.

All of these previously known cutting tools enjoy certain advantages in certain machining operations and suffer certain disadvantages in other machining operations. For example, certain types of ceramic compositions have been found to be particularly useful for machining certain types of metals and yet ineffective for machining other types of metals. Similarly, the addition of certain materials, such as silicon carbide whiskers, significantly increases the overall cost of the ceramic cutting tool and, for that reason, is disadvantageous.

While the previously known ceramic cutting tools have proven effective in cutting ferrous materials, such as cast iron, such ceramic materials have exhibited a short, and therefore undesirable, tool life. While the addition of some materials, such as silicon carbide whiskers, increases the tool life when cutting ferrous materials, the addition of such materials also significantly increases the cost of the ceramic cutting tool.

SUMMARY OF THE PRESENT INVENTION

The present invention provides a ceramic cutting tool, as well as a method for cutting ferrous materials, especially cast iron, which overcome all of the above mentioned disadvantages of the previously known ceramic cutting tools.

In brief, the ceramic cutting tool of the present invention consists essentially of a hot pressed composite of 6 to 30% by weight aluminum nitride (AlN) and the balance alpha alumina ($Al_2O_3$). No other materials, except unavoidable trace elements, are contained within the ceramic cutting tool.

In order to construct the ceramic cutting tool, the alumina and aluminum nitride are thoroughly mixed in a ball mill. Following mixing, the powder is loaded into graphite molds and then hot pressed. The resulting ceramic billet is then removed and cutting tool blanks are sliced from the billet using diamond cutting wheels.

DETAILED DESCRIPTION OF A PREFERRED EMBODIMENT OF THE PRESENT INVENTION

In a typical metal cutting operation using ceramic cutting tools, the ceramic cutting tool and the metal are moved relative to each other. For example, the cutting tool can be held stationary while the workpiece is moved relative to the cutting tool, the workpiece can be held stationary while the cutting tool is moved into the metal, or a combination of both.

The composition of the ceramic cutting tool of the present invention consists essentially of 6 to 30% by weight aluminum nitride (AlN) and the balance alpha alumina ($Al_2O_3$). Other than the alumina and the aluminum nitride, only unavoidable trace elements are present within the composition.

In order to construct the ceramic cutting tool of the present invention, a fine particle grade of alumina, such as Reynolds grade RC-HP-DBM ±0.05% magnesium oxide and a fine particle grade of aluminum nitride, such as Starck grade D, are placed in a rubber lined ball mill. Burundum media and sufficient denatured ethyl alcohol are added to the ball mill to cover the powder. The ball mill is then operated for an extended period of time, such as at 60 RPM for 24 hours, in order to thoroughly mix the alumina and aluminum nitride powder.

After the alumina and aluminum nitride powder are thoroughly mixed, the alcohol is evaporated from the resulting slurry and a powder is then strained through a 20 mesh filter in order to remove any unmixed clumps that may remain within the material.

The powder is then loaded into a cylindrical graphite mold and compacted between graphite punches at a pressure, such as 500–1000 psi. Preferably the graphite punches are lined with molybdenum sheets.

The powder compact is then hot pressed by heating the compact to between 1600° and 1650° C. over a period of three hours during which the pressure is increased to 3000 psi. The powder compact is then held at 3000 psi and 1600°–1650° C. until densification is completed. Such densification is completed in approximately 1½ hours.

The remaining ceramic billet is then removed from the graphite mold and cutting tool blanks are sliced from the billet using a resin bonded diamond wheel in the conventional fashion Peripheral, corner, and chamfer grinding to the final insert shape are also completed utilizing diamond wheels.

Table I below gives the results of the machine tests in which pearlitic grey cast iron of 231 Brinell hardness was rough turned at conditions of 2000 sfpm speed, 0.0243 ipr feed and a cutting depth of 0.060 inches.

Three types of different commercial ceramic cutting tools were evaluated and contrasted with three different compositions of the ceramic cutting tool of the present invention. In each case, style SNG 433T inserts were used and the results of the tests were as follows:

TABLE I

| TOOL | CUTTING TIME (MINUTES) | FLANK WEAR (INCHES) | OBSERVATIONS | CALCULATED TOOL LIFE at .010" FLANK WEAR (MINUTES) |
|---|---|---|---|---|
| Commercial "K" | 0.00 | — | Corner broke on entry | — |
| Commercial "K" | 2.98 | .010 | Uniform wear | 3 |
| Commercial "H" | 1.31 | — | Nose broke | — |
| Commercial "H" | 1.96 | — | Nose failed | — |
| Commercial "C" | 7.22 | .0045 | Uniform wear | 16 |
| PRESENT INVENTION: | | | | |
| 20-1 (6 w/o AlN) | 7.15 | .0025 | Uniform wear | 55 |
| 20-1 (6 w/o AlN) | 7.45 | .003 | Uniform wear | 31 |
| 20-2 (14 w/o AlN) | 7.54 | .003 | Uniform wear | 33 |
| 40-4 (20 w/o AlN) | 6.21 | .0035 | Uniform wear | 22 |
| 82-3 (30 w/o AlN) | 6.68 | .004 | Uniform wear | 21 |

The Commercial K tool is a SiAlON based tool while both the Commercial H and Commercial C tools are Al$_2$O$_3$-TiC cutting tools.

As is clear from the above tables, the commercial tools H and K were incapable of machining consistently under the severe machining conditions of this test. Although the insert K in one test did survive, it wore out rapidly. Furthermore, although the commercial insert C performed passably, its tool life was only approximately one half of the average tool life shown by the other tools utilizing the composition of the present invention.

It has also been found that when the amount of aluminum nitride additives falls outside the optimal range of 6-30 weight percent, the properties of the resulting cutting tool rapidly become inferior. For example, an aluminum nitride addition of only 3% by weight resulted in catastrophic failure during the test of Table I after only 3.7 minutes. On the opposite end of the scale, an addition of 50% by weight of aluminum nitride reduced the tool life to 15.5 minutes utilizing the test parameters of Table I above. 15.5 minutes is less than the tool life of the commercial tool C shown in Table I.

A further test was conducted on machining pearlitic nodular cast iron of 220 Brinell hardness. In this second series of tests, the work was machined at a cutting speed of 1200 sfpm, 0.0122 ipr feed and a cutting depth of 0.060 inches. The results of this cutting test are illustrated below:

TABLE II

| TOOL | CUTTING TIME (MINUTES) | FLANK WEAR (INCHES) | TOOL LIFE at .010" FLANK WEAR (MINUTES) | OBSERVATIONS |
|---|---|---|---|---|
| Commercial "K" | 3.30 | .017 | 1.9 | Cratering |
| Commercial "H" | 3.11 | .010 | 3.1 | Uniform wear |
| Commercial "C" | 6.01 | .013 | 4.2 | .015" scale line groove |
| Present Invention: | | | | |
| (14 w/o AlN) | 6.43 | .010 | 6.4 | Uniform wear |

As shown above, the insert of the present invention utilizing 14% by weight aluminum nitride and the balance alumina show a tool life of approximately 50% greater than its closest commercial competitor, namely commercial type C cutting tool. In addition, under these cutting conditions, the commercial tool did exhibit some non-uniform wear in contrast to the uniform wear shown by the tool of the present invention.

A still further series of tests were conducted on pearlitic nodular cast iron of 220 Brinell hardness, a cutting speed of 1500 sfpm, 0.0152 ipr feed and a cutting depth of 0.060 inches. Thus, in contrast to the test shown in Table II, the test shown in Table III below utilized not only a higher cutting speed, but also a greater feed rate for the cutting tool. The test results were as follows:

TABLE III

| TOOL | CUTTING TIME (MINUTES) | FLANK WEAR (INCHES) | TOOL LIFE at .010" FLANK WEAR | OBSERVATIONS |
|---|---|---|---|---|
| Commercial "C" | 3.67 | .013 | 2.5 min. | — |
| Commercial "H" | 2.13 | .0105 | 2.0 | — |
| Present Invention: | | | | |
| 14 w/o AlN | 5.20 | .010 | 5.2 | |

As is well known, the tool life is conventionally considered to be the duration of the cutting time when the flank wear reaches 0.010 inches. Thus, as shown above, the present invention utilizing 14% by weight aluminum nitride enjoyed a tool life of 5.2 minutes. In contrast to this, both the commercial C and commercial H tools exhibited in excess of 0.010 inch wear in under 2.5 minutes. Thus, the present invention exhibited more than twice the tool life of the commercial inserts C and H under the rigorous machining conditions set forth in Table III.

Still a further series of tests were conducted on pearlitic nodular cast iron of 220 Brinell hardness, a machining speed of 1800 sfpm, 0.0183 ipr feed and 0.060 inches cutting depth. Thus, these tests, which are shown in Table IV below, constitute the most severe of the machining conditions on which the cutting tools were subjected. The results of this machining test are shown below in Table IV:

TABLE IV

| TOOL | CUTTING TIME (MINUTES) | FLANK WEAR (INCHES) | TOOL LIFE at .010" FLANK WEAR | OBSERVATIONS |
|---|---|---|---|---|
| Commercial "C" | 2.67 | .0125 | 1.9 min. | Uniform wear |
| Commercial "H" | 1.38 | .008 | — | Chip on nose |

TABLE IV-continued

| TOOL | CUTTING TIME (MINUTES) | FLANK WEAR (INCHES) | TOOL LIFE at .010" FLANK WEAR | OBSERVATIONS |
| --- | --- | --- | --- | --- |
| Present Invention: | | | | |
| (14 w/o AlN) | 2.85 | .0095 | 3.1 | Uniform wear |

As shown in the above table, even under these severe machining conditions, the present invention has a tool life 63% longer than its nearest competitor, i.e. the commercial insert C.

As is clear from the foregoing, the cutting tool of the present invention exhibits superior tool life when cutting ferrous materials and especially when cutting cast iron. Furthermore, not only does the ceramic cutting tool of the present invention exhibit such superior tool life, but it does so with uniform wear of the cutting edge. This is in sharp contrast to the other commercial tools which suffer from chips, cratering and uneven wear during the machining test.

Furthermore, although the ceramic cutting tool of the present invention can consist of 6-30% by weight aluminum nitride, in practice 14% aluminum nitride by weight has proven to be optimal.

Although the ceramic cutting tool of the present invention has proven to be especially effective in machining nodular cast iron, the exact reason why the composition of the present invention exhibits these machining characteristics is not fully understood.

However, a possible explanation for the superior behavior of these tools is the following:

Aluminum nitride is known to be an excellent thermal conductor, relative to most other ceramics. In fact, its thermal conductivity is greater than that of many metals. Because of this and due to the fact that the thermal expansion coefficient of aluminum nitride is relatively low, its thermal shock resistance is greater than that of all commonly used ceramics. This improvement in thermal shock resistance which is imparted to the alumina base material through the addition of aluminum nitride is believed to be the cause of its greater resistance to chipping and breakage, and overall longer tool life, compared to other ceramic tools. This serves to explain why the insert with only 3% AlN failed by breakage. Its AlN content was below the minimum required to give the tool sufficient thermal shock resistance to withstand those severe cutting conditions. Note also that the composition containing 50% AlN, which is greater than the optimal amount of AlN, machined without chipping or breaking. Its short tool life can be explained by the fact that since AlN does not have the wear resistance of $Al_2O_3$, a composition containing as much as 50% AlN showed a deficiency in wear resistance and consequently in tool life.

Having described our invention, however, many modifications thereto will become apparent to those skilled in the art to which it pertains without deviation from the spirit of the invention as defined by the scope of the appended claims.

We claim:

1. A ceramic cutting tool consisting essentially of a hot pressed composition of alpha alumina and 6 to 30% by weight of aluminum nitride.

2. The invention as defined in claim 1 wherein said composition comprises substantially 14% by weight of aluminum nitride.

3. In a method of cutting ferrous metal wherein a cutting tool is brought into contact with a ferrous metal workpiece and the cutting tool and ferrous metal workpiece move relative to each other whereby metal is removed by the cutting tool from the metal workpiece, the improvement comprising using a hot pressed composite cutting tool consisting essentially of alpha alumina and 6 to 30 weight % aluminum nitride.

4. The invention as defined in claim 3 wherein the composition consists essentially of alpha alumina and 14 weight % aluminum nitride.

5. The invention as defined in claim 3 wherein said metal workpiece is a cast iron metal workpiece.

* * * * *